(12) United States Patent
Ueda

(10) Patent No.: US 7,176,669 B2
(45) Date of Patent: Feb. 13, 2007

(54) SWITCHING REGULATOR WITH FREQUENCY MODULATION TO VARY FREQUENCY BASED ON A LOAD CONDITION, AND CONTROL METHOD THEREFOR

(75) Inventor: Goro Ueda, Nukata-gun (JP)

(73) Assignee: Denso Corporation, Kariya (JP)

( * ) Notice: Subject to any disclaimer, the term of this patent is extended or adjusted under 35 U.S.C. 154(b) by 31 days.

(21) Appl. No.: 11/052,111

(22) Filed: Feb. 8, 2005

(65) Prior Publication Data

US 2005/0200343 A1   Sep. 15, 2005

(30) Foreign Application Priority Data

Mar. 9, 2004  (JP)  ............... 2004-065550

(51) Int. Cl.
*G05B 24/02* (2006.01)
*G05F 1/10* (2006.01)
*G05F 1/40* (2006.01)

(52) U.S. Cl. .................. 323/351; 323/222; 323/282
(58) Field of Classification Search ............ 323/222, 323/351, 282
See application file for complete search history.

(56) References Cited

U.S. PATENT DOCUMENTS

| | | | | |
|---|---|---|---|---|
| 5,568,044 A | * | 10/1996 | Bittner | 323/272 |
| 5,764,495 A | * | 6/1998 | Faulk | 363/21.13 |
| 5,912,552 A | * | 6/1999 | Tateishi | 323/285 |
| 6,011,706 A | * | 1/2000 | Adragna et al. | 363/41 |
| 6,204,649 B1 | * | 3/2001 | Roman | 323/282 |
| 6,418,038 B2 | * | 7/2002 | Takahama et al. | 363/17 |
| 6,522,115 B1 | * | 2/2003 | Greitschus | 323/288 |
| 6,674,789 B1 | * | 1/2004 | Fardoun et al. | 375/132 |
| 6,847,257 B2 | * | 1/2005 | Edwards et al. | 330/10 |
| 2005/0052249 A1 | * | 3/2005 | Gan et al. | 331/23 |

FOREIGN PATENT DOCUMENTS

JP   A-2003-153526   5/2003

* cited by examiner

*Primary Examiner*—Karl Easthom
*Assistant Examiner*—Harry R Behm
(74) *Attorney, Agent, or Firm*—Posz Law Group, PLC

(57) ABSTRACT

In a frequency modulation type switching regulator for producing an output voltage to a load, an error amplifier produces an error voltage indicative of a difference between the output voltage and a reference voltage. A switching device is turned on and off at a switching frequency corresponding to the error voltage. A voltage-frequency modulation circuit monitors an operation condition of the load. The modulation circuit generates a varying voltage, which varies around the error voltage, when the monitored operation condition is substantially unchanged. The switching frequency is switched to another frequency corresponding to the varying voltage, so that noise level may be reduced.

6 Claims, 3 Drawing Sheets

US 7,176,669 B2

SWITCHING REGULATOR WITH FREQUENCY MODULATION TO VARY FREQUENCY BASED ON A LOAD CONDITION, AND CONTROL METHOD THEREFOR

CROSS REFERENCE TO RELATED APPLICATION

This application is based on and incorporates herein by reference Japanese Patent Application No. 2004-65550 filed on Mar. 9, 2004.

FIELD OF THE INVENTION

The present invention relates to a frequency modulation type switching regulator, which generates a regulated output voltage by varying the switching frequency of a switching device, and a control method for the same.

BACKGROUND OF THE INVENTION

A switching regulator is constructed to generate a regulated output voltage by repetition of a switching operation of a switching device, and therefore the switching device generates unnecessary radiation noises at the time of switching operation. The regulated output voltage does not vary so much in the stationary condition in which the operating condition of a load to which the regulated output voltage is applied from the switching regulator is substantially unchanged.

As a result, the switching device performs switching in a uniform pattern. The noise level largely increases in this condition, because the noise components concentrate on the frequencies, which are integer times of the switching frequency of the switching device.

To decrease the noise level, in JP 2003-153526A, the switching frequency is randomly varied thereby to avoid concentration of the switching noise frequencies on the specific frequencies. This method, however, is directed to a pulse-width modulation type switching regulator, and hence the frequency of carrier waves applied to a pulse-width modulation circuit. This method is therefore not useful for a frequency modulation type switching regulator.

The frequency modulation type switching regulator varies the switching frequency in accordance with load conditions. Therefore the frequency modulation type is more advantageous to reduce noises than the pulse-width modulation type. The frequency modulation type still needs to reduce noise generation, because the noise components concentrate on the specific frequencies in the stationary condition.

SUMMARY OF THE INVENTION

It is therefore an object of the present invention to reduce a noise level of a frequency modulation type switching regulator.

According to the present invention, in a frequency modulation type switching regulator for producing an output voltage to a load, an error voltage indicative of a difference between the output voltage and a reference voltage is produced and a switching device is turned on and off at a switching frequency corresponding to the error voltage. An operation condition of the load is monitored. The operation condition may be detected by using the error voltage. A varying voltage, which varies around the error voltage, is generated when the monitored operation condition is substantially unchanged. The switching frequency is switched to another frequency corresponding to the varying voltage, so that noise level may be reduced.

In the frequency modulation type switching regulator, the output current and hence the output voltage changes when the operation condition of the load changes. The switching frequency therefore changes to regulate the output voltage to a target reference voltage. The switching frequency also becomes substantially unchanged, when the operation condition of the load become substantially unchanged. As a result, the noise harmonic component energy concentrates and the noise level increases. By varying the switching frequency in this condition, the noise harmonic component energy is distributed to lower the noise level.

BRIEF DESCRIPTION OF THE DRAWINGS

The above and other objects, features and advantages of the present invention will become more apparent from the following detailed description made with reference to the accompanying drawings. In the drawings.

DETAILED DESCRIPTION OF THE PREFERRED EMBODIMENT

Figure 1:
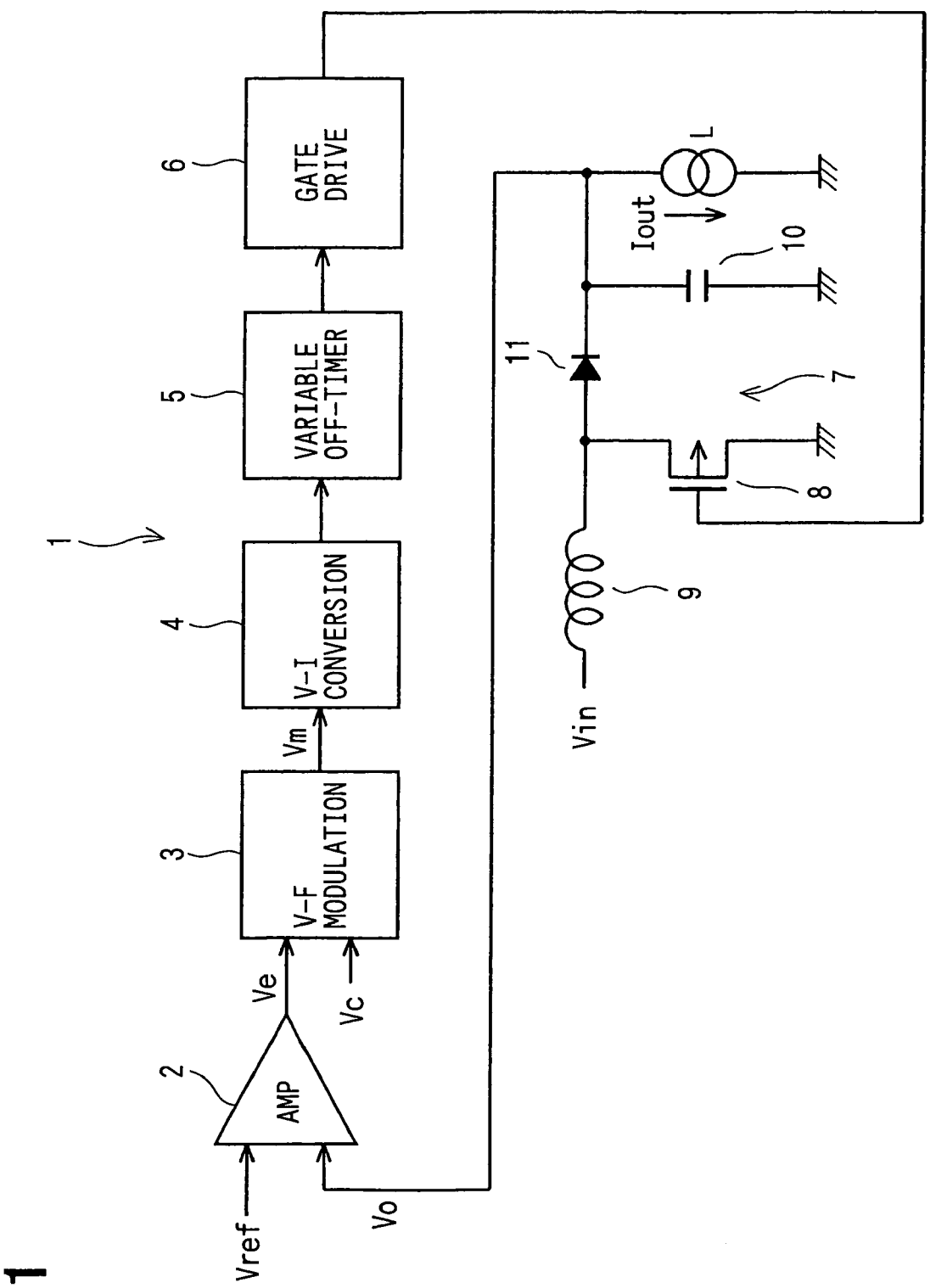
FIG. 1 is a circuit diagram showing a frequency modulation type switching regulator according to an embodiment of the present invention.

Referring to FIG. 1, a frequency modulation type switching regulator 1 includes an error amplifier 2, a voltage-frequency (V-F) modulation circuit 3, a voltage-current (V-I) conversion circuit 4, a variable off-timer 5, a gate drive circuit 6 and a switching circuit 7. The above construction other than the voltage-frequency modulation circuit 3 is conventional.

The error amplifier 2 outputs an error voltage Ve, which is a difference between a reference voltage Vref and an output voltage Vo, to the voltage-frequency modulation circuit 3. The modulation circuit 3 monitors the error voltage Ve, and outputs as a voltage Vm either the error voltage Ve or a varying voltage V1.

The conversion circuit 4 converts the voltage Vm to a current. The off-timer 5 variably sets its off-time of switching in accordance with the current or the voltage Vm. The drive circuit 6 drives, based on on-off timing pulses set by the off-timer 5, the gate of a P-channel MOSFET 8 used as a switching device in the switching circuit 7.

The switching circuit 7 includes, in addition to the FET 8, a coil 9, a capacitor 10 and a diode 11. The coil 9 receives an input voltage Vin at one end thereof. The FET 8 has the source and the drain connected between the other end of the coil 9 and the ground. The diode 11 has an anode and a cathode connected to the source of the FET 8 and one end of the capacitor 10, respectively. The capacitor 10 is grounded at the other end thereof. The output voltage Vo is applied to the error amplifier 2 from the cathode of the diode 11. This output voltage Vo is also applied to a load L, which may be a current source.

Figure 2:
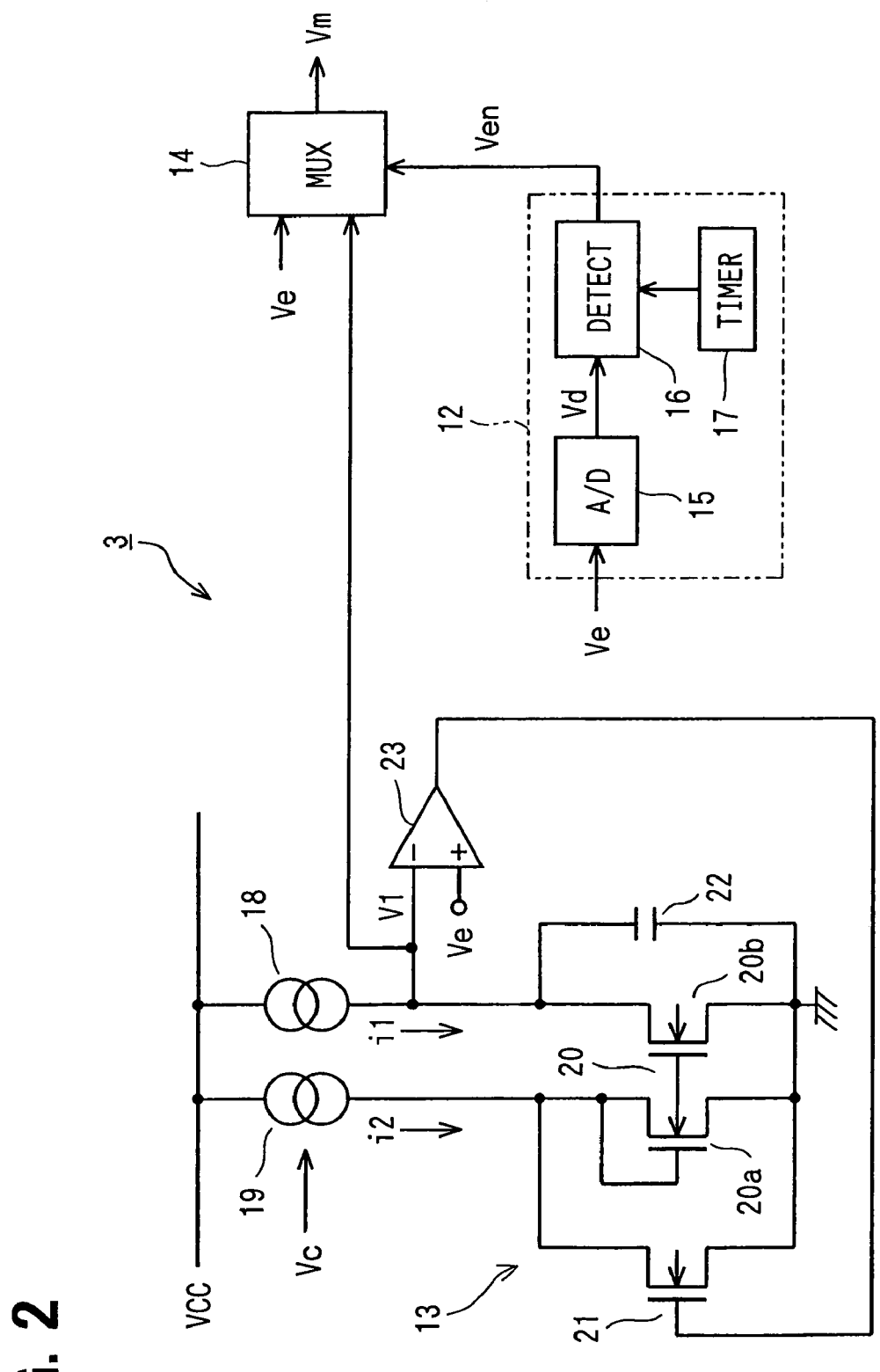
FIG. 2 is a circuit diagram showing a voltage-frequency conversion circuit shown in FIG. 1.

The voltage-frequency modulation circuit 3 is constructed as shown in FIG. 2. The modulation circuit 3 includes an error voltage monitor circuit 12, a varying voltage generation circuit 13 and a multiplexer 14.

The monitor circuit 12 includes an A/D conversion circuit 15, a detection circuit 16 and a timer 17. The A/D conversion circuit 15 converts the error voltage Ve into a digital data and applies the digital data to the detection circuit 16. The detection circuit 16 compares the digital data applied previously and presently, and starts measuring time by the timer 17 when the compared data agree. The detection circuit 16 outputs to the multiplexer 14 an enable voltage Ven when the measured time reaches a predetermined time, that is, when the compared digital data agree for the predetermined time.

The multiplexer circuit 14 outputs the error voltage Ve as the voltage Vm, when the enable voltage Ven is not applied. It outputs however the varying voltage V1 as the voltage Vm in place of the error voltage Ve, when the enable voltage Ven is applied. The varying voltage V1 is generated by the varying voltage generation circuit 13.

In the varying voltage generation circuit 13, a first constant current source 18 and a second constant current source 19 are connected to a power supply line VCC. The first constant current source 18 is set to supply a first constant current i1. The second constant current source 19 is set to supply a second constant current i2, which is varied in accordance with a control voltage Vc applied from an external side. The first and the second currents i1 and i2 are set to satisfy: $i2=2 \times i1$.

A current mirror circuit 20, which is constructed with N-channel MOSFETs 20a and 20b, is connected between the current sources 18, 19 and the ground. The gates of the FETs 20a and 20b are both connected to the drain of the FET 20a. A N-channel MOSFET 21 is connected to the FET 20a in parallel. A capacitor 22 is connected to the FET 20b in parallel. The FET 21 has the same operational characteristics as the FETs 20a and 20b.

A comparator 23 is connected to the drain of the FET 20b through its inverting input, and receives the error voltage Ve at its non-inverting input. The comparator 23 is also connected to the gate (switching control terminal) of the FET 21. The voltage developed across the FET 20b (capacitor 22) is applied to the inverting input of the comparator 23 as the varying voltage V1.

The varying voltage generation circuit 13 operates as follows. The comparator 23 produces a high level output voltage, when the varying voltage V1 is lower than the error voltage Ve. The FET 21 turns on, so that a current ($i2 \times \frac{1}{2}$) of one half of the second current i2 flows in each of the FETs 20a and 21. The first current i1 also flows from the first constant current source 18. If the capacitor 22 has discharged, the current i1 charges the capacitor 22 so that the varying voltage V1 applied to the comparator 23 gradually increases.

The comparator 23 produces a low level output voltage and the FET 21 responsively turns off, when the varying voltage V1 becomes higher than the error voltage Ve. The second current i2 flows in the FET 20a. Since the first current i1, which flows from the first constant current source 18, is set be one half of the second current i2, the capacitor 22 discharges to decrease the varying voltage V1.

Figure 3A:
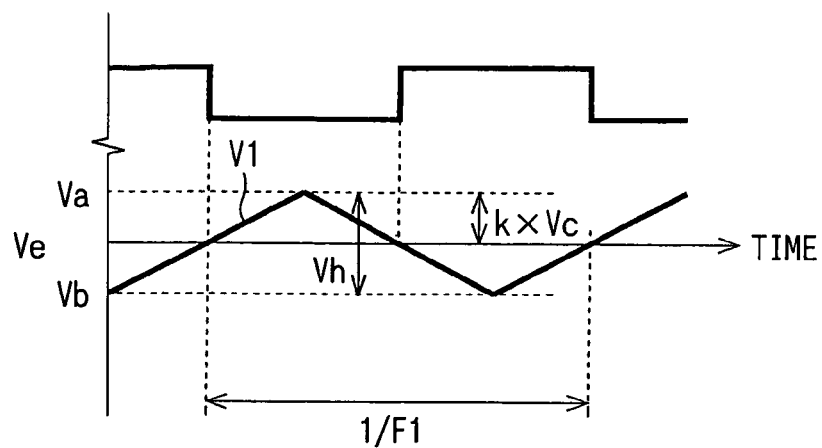
FIGS. 3A and 3B are timing diagrams showing signals in the varying voltage generation circuit shown in FIG. 2.
Figure 3B:
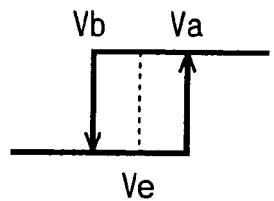

By repeating the above operation, the varying voltage V1 applied to the inverting input of the comparator 23 changes in a triangular-wave shape periodically as shown in FIG. 3A. Thus, the varying voltage generation circuit 13, which includes the comparator 23, operates like a comparator having a hysteresis characteristic in response to the turning on or off of the FET 21 as shown in FIG. 3B.

It is assumed here that a maximum and a minimum of the varying voltage V1 is Va and Vb, respectively, and the difference Va−Vb of those voltages is Vh. The voltages Va and Vb are proportional to the control voltage Vc and hence expressed as $Va=k \times Vc$, for instance. It is further assumed that the capacitance of the capacitor 22 is C1 and the current flowing in the capacitor 22 is one half of the first current i1. The frequency F1 of the varying voltage V1 is defined as $F1=i1/(2 \times C1 \times Vh)$.

As described above, the voltage Vm (=V1) is output to the voltage-current conversion circuit 4 through the multiplexer 14, when the monitor circuit 12 detects that the error voltage Ve becomes unchanged. Thus, the switching frequency of the FET 8 is varied with the varying voltage V1.

According to the above embodiment, the voltage-frequency modulation circuit 3 monitors the operating condition of the load to which the output voltage is applied, and controls to vary the switching frequency when the monitored operating condition is unchanged. Thus, the noise level can be further reduced even in the frequency modulation type switching regulator 1.

In addition, the error amplifier 2 outputs the error voltage Ve indicative of the difference of the output voltage Vo from the reference voltage Vref, and the FET 8 performs a switching operation in correspondence with the frequency set by the error voltage Ve. The monitor circuit 12 monitors the error voltage Ve, and outputs the varying voltage V1 in place of the error voltage Ve when the error voltage Ve becomes unchanged. Thus, the switching frequency is varied in correspondence with the varying voltage V1.

Further, the varying voltage generation circuit 13 is constructed with the first constant current source 18, second constant current source 19, current mirror circuit 20, FET 21 in addition to the comparator 23. As a result, it becomes possible to generate the varying voltage V1, which varies around the error voltage Ve, by providing the comparator 23 with the hysteresis characteristic to oscillate.

The above embodiment may be modified in various ways without departing from the spirit of the invention.

For instance, the detection circuit 16 may be constructed to determine that the load operating condition is unchanged as long as the A/D conversion data Vd changes only slightly between the previous data and the present data even if the two data are not identical.

The second current i2 of the second constant current source 19 need not exactly twice as large as the first current i1 of the first constant current source 18. It is however preferred that the second current i2 is larger than the first current i1.

The varying voltage generation circuit 13 may be constructed differently from that shown in FIG. 2, as far as it generates a voltage varying around the error voltage Ve which became substantially unchanged.

The P-channel MOSFET 8 may be replaced with a N-channel MOSFET. The switching device is not limited to a MOSFET, but may be a bipolar transistor, an IGBT or the like.

What is claimed is:

1. A frequency modulation type switching regulator comprising:
    a switching device for performing a switching operation at a switching frequency to generate an output voltage for a load, the switching frequency being varied with a variation in an operation condition of the load;
    an operation monitor means for monitoring the operation condition of the load and determining whether the operation condition is changed or unchanged; and a control means for varying the switching frequency of the switching device even when the operation condition monitored by the operation monitor means becomes substantially unchanged.

2. A frequency modulation type switching regulator comprising:
- a switching device for performing a switching operation at a switching frequency to generate an output voltage for a load;
- an operation monitor means for monitoring an operation condition of the load;
- a control means for varying the switching frequency of the switching device when the operation condition monitored by the operation monitor means becomes substantially unchanged; and
- an error amplifier means for producing an error voltage corresponding to a difference between the output voltage and a reference voltage,
- wherein the switching device performs the switching operation at a frequency corresponding to the error voltage,
- the operation monitor means monitors the error voltage, and
- the control means outputs a varying voltage, which varies around the error voltage, in place of the error voltage when the error voltage becomes substantially unchanged.

3. The frequency modulation type switching regulator as in claim 2, wherein the control means includes:
- a first constant current source, connected to a power supply source, for supplying a first current;
- a second constant current source, connected to the power supply source, for supplying a second current which is larger than the first current;
- a current mirror circuit connected to the first and the second constant current sources at its one end and to a ground at another end thereof;
- a capacitor connected to the current mirror circuit in parallel at a side of the first current source;
- a switching circuit connected to the current mirror circuit in parallel at a side of the second constant current source; and
- a comparator, connected to the capacitor and the error amplifier means, for comparing the varying voltage and the error voltage and controlling an on-off operation of the switching circuit in accordance with a comparison result thereof.

4. A control method for a frequency modulation type switching regulator comprising:
- turning on and off, at a switching frequency determined to vary with an operation condition of a load, a switching device to generate an output voltage for the load;
- monitoring an operation condition of the load; and
- varying the switching frequency of the switching device in a predetermined cyclic manner even when the operation condition monitored by the monitoring step becomes substantially unchanged.

5. A control method for a frequency modulation type switching regulator comprising:
- turning on and off at a switching frequency, a switching device to generate an output voltage for a load;
- monitoring an operation condition of the load;
- varying the switching frequency of the switching device when the operation condition monitored by the monitoring step becomes substantially unchanged;
- generating an error voltage corresponding to a difference between the output voltage and a reference voltage; and
- generating a varying voltage, which varies around the error voltage,
- wherein the step of monitoring monitors the error voltage as the operation condition, and
- the step of varying selects the error voltage and the varying voltage, when the error voltage is determined to be changing and unchanged, respectively, thereby to determine the switching frequency in accordance with a selected voltage.

6. The frequency modulation type switching regulator as in claim 1, wherein the operation monitor means receives A/D conversion data, and the operation monitor means determines that the operation condition is unchanged as long as A/D conversion data changes only slightly between previous data and present data.

* * * * *